Sept. 9, 1930.　　　S. H. BRAKENSIEK　　　1,775,233
MEANS FOR CLARIFYING LIQUIDS
Filed Feb. 18, 1926
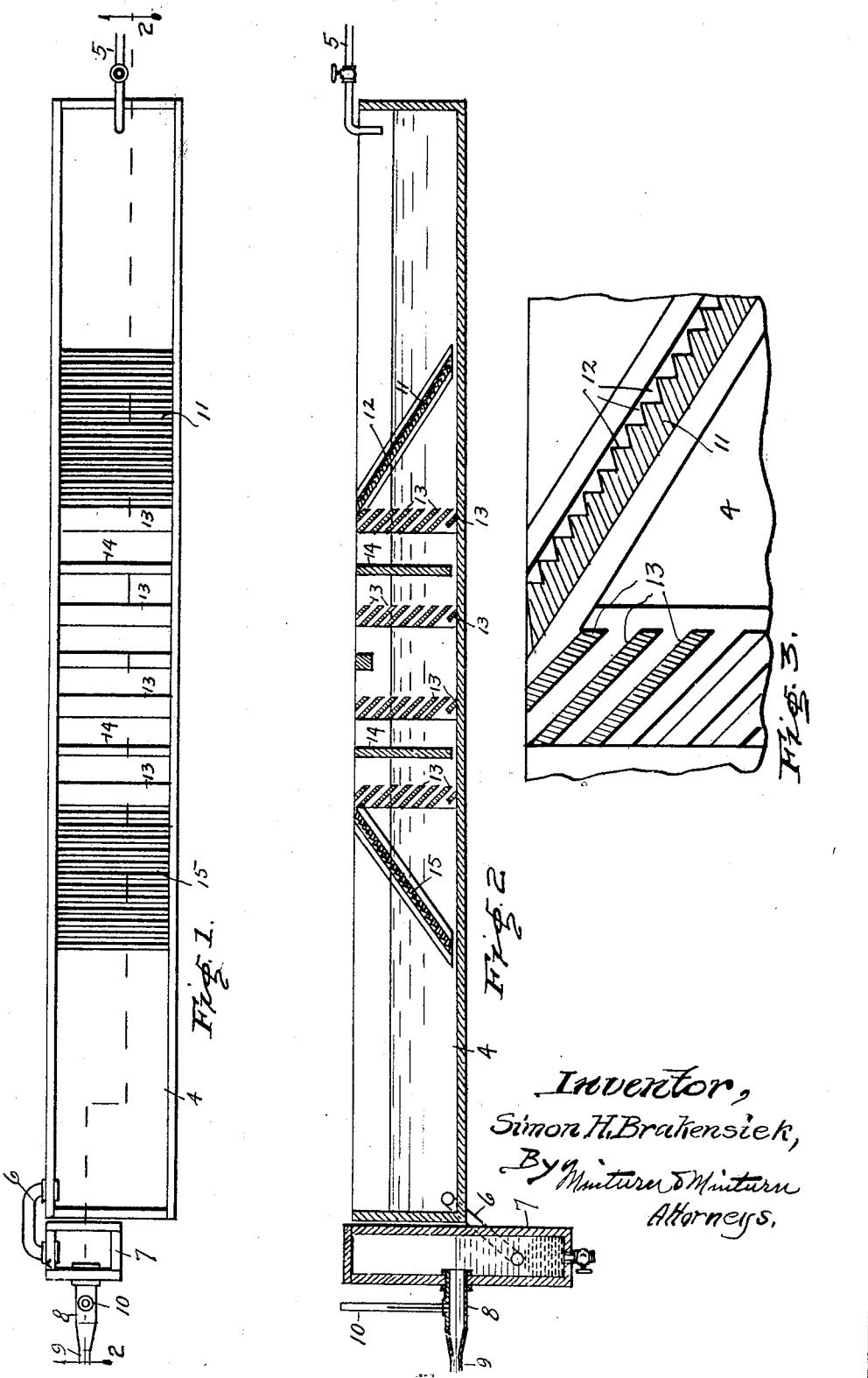
Inventor,
Simon H. Brakensiek,
By Minturn & Minturn
Attorneys.

Patented Sept. 9, 1930

1,775,233

UNITED STATES PATENT OFFICE

SIMON H. BRAKENSIEK, OF COLUMBUS, ILLINOIS

MEANS FOR CLARIFYING LIQUIDS

Application filed February 18, 1926. Serial No. 88,978.

This invention relates to improvements in clarifiers for removing solid matter from liquids, such as mud, scale, fine particles of bagasse from cane juice; pulp, hulls and other impurities from cider, and the like; and the object, also, is, at the same time, to largely remove the causes of fermentation.

My invention is particularly adapted for clarifying the juice of sorghum as it comes from the cane-mill and before it is delivered to the evaporating pan, for which I have extensively used it, and I will describe it for that use, although I do not desire to be limited to that, or to the clarification of any specific liquid.

I have found, in practice, that the bagasse and similar fibrous material of lighter specific gravity than the liquid, remains in suspension in it, and not only will not settle and separate out by gravity, but that said lighter material holds the mud and other heavier foreign bodies in suspension, which are also generally darker in color and discolor the finished product if allowed to remain. Also, that in this suspended mass are practically all of the germs of fermentation.

The objects of my invention are, first, to remove the lighter fibrous material by means other than sedimentation; and, second, to remove the remaining heavier foreign matter by sedimentation.

I accomplish the above, and other objects which will hereinafter appear, by the mechanism illustrated in the accompanying drawing, in which—

Fig. 1 is a top plan view of my improved clarifier; Fig. 2, is a vertical section on the line 2—2 of Fig. 1; and Fig. 3 is a fragment in vertical section of a part of Fig. 2 on a larger scale.

Like characters of reference indicate like parts in the several views of the drawing.

All of the parts, except the pipes, are preferably of wood to resist the acid action which the cane-juice to be clarified has on metal.

A long narrow tank 4 is supplied with cane-juice directly from the mill through the pipe 5, which discharges over the top of the tank at one end; and a discharge from the other end of the tank is through a pipe 6 taking from near the bottom of the tank. The tank-bottom preferably slopes slightly toward the outlet at pipe 6.

The pipe 6, discharges into an adjacent vertical settling-box 7, which has a discharge through a pipe 8 that tapers at a suitable distance, to a smaller discharge pipe 9; the enlargement 8 being for the purpose of more unrestrictedly receiving the liquid passing into it from the box 7, in order, thereby, to avoid setting up currents which might rile the sediment which settles to the bottom of the box. The inside bottom of pipe 9 is preferably on a line with the bottom of the discharge opening to the pipe 6, in order to drain out all of the liquid in the tank 4, under proper conditions. The depth of box 7, below said outlet, is such that ample room for settlings is provided below the inlet from pipe 6; and the inlet from pipe 6 is removed from the bottom of the box and also from the mouth of pipe 8 such that the clarified liquid is decanted without disturbing the sediment, settling at the bottom of the box. A glass stand-pipe 10 indicates the height of the body of liquid in the chamber 7.

I will now describe the means by which the bagasse and foreign matter, of lighter specific gravity than the juice, is removed from the liquid. This cannot be strained out because of the syrupy nature of the juice which quickly gums and closes the strainer. The flow of the juice is from the pipe 5 to the pipe 6, and I have found by experiment that an oblique board 11, sloping toward the inlet to the tank 4, acts as a skimmer and also as a receptacle for the deposit of said lighter matter brought against it, by the requirement that the liquid turn back in its flow in order to pass under the lower end of the board 11 in its further progress through the tank; a restricted passage is provided between the board 11 and the bottom of the tank, and to keep the foreign matter accumulating on the board from moving down by gravity and dropping off of the lower end of the board, there to be taken up again by the liquid, I prefer to corrugate the upper surface transversely, as shown at 12 (see Fig. 3). The board 11 is removable and is taken out and cleaned as the accumulation on it requires.

After passing under the board 11, the juice flows between a series of oblique boards 13, here shown as eight in number, arranged in a vertical series. These act as additional skimmers and gatherers to contact with the matter to be removed at whatever distance above the tank bottom it may be suspended in the juice, and remove the objectionable matter by its adherence to the boards. The boards are separately removable for cleaning. The lowest board 13 extends into contact with the bottom of the tank such as to prevent the flow of the liquid between it and the bottom, and this board is narrower than the rest of the series to lower the line of overflow over it. This series of boards 13 may be repeated as many times as is necessary to remove all of the suspended material of light specific gravity. I have here shown four series, as desirable for sorghum cane-juice, but a greater or less number may be used for other liquids.

Baffle boards 14, raised a short distance above the bottom of the tank, are desirable to mix the juice by forcing it to flow down and under the baffle boards, as it passes from one series of oblique boards 13 to the next.

At the end of the several series 13 is an oblique board 15, similar to the board 11, the only difference being that it slopes in the posite direction. Its principal function is to catch and hold the heavier foreign matter in the juice which is deposited by sedimentation in the back-water formed above the board 15, by the position of the latter, now that the waste matter of lighter specific gravity which previously held it in suspension, has been removed.

The rest of the heavier refuse settles toward the bottom of tank 4 and is drawn out through pipe 6 into the box 7, entering the box considerably below the mouth of the outlet pipe 8, and settles to the bottom of box 7, from whence it is removed through a clean-out in the bottom of the box which is here closed by a valve 16.

The clarified juice is decanted off leaving the settlings behind, as has previously been stated.

In practice, the cane juice passes continuously through the above described purifying apparatus and the purification is completed as rapidly as the juice can flow in at pipe 5 and out at pipe 8, not to exceed five minutes in point of actual time; and in the manufacture of sorghum molasses the sharp strong taste which increases rapidly with age, and the dark color, are removed. The syrup is light yellow in color, clear and transparent, and keeps well without acquiring the usual disagreeably strong taste. In fact, fermentative properties are removed with the removal of the suspended matter of less specific gravity than the cane juice.

While I have here shown and described the preferred embodiment of my invention, it is capable of many variations and modifications, some of which I have mentioned, and I therefore do not desire to be limited to the construction shown nor to the liquid clarified by it, and what I claim as new, is—

1. In a clarifier for liquids, a tank having an inlet and an outlet, a partition in the tank oblique toward the inlet having a reduced liquid passage under it, and gravitation retarding means on its upper surface.

2. In a clarifier for liquids, a tank having an inlet and an outlet, a partition in the tank oblique toward the inlet having a reduced liquid passage under it and gravitation retarding means on its upper surface; one or more series of units each unit comprising a plurality of oblique members which are spaced apart for liquid flow upwardly and rearwardly between them, when one or more of said members are submerged in the liquid for contact and adhesion thereto of matter suspended in the liquid.

3. In a clarifier for liquids, a tank having an inlet at one end and an outlet at the other, a partition in the tank oblique toward the inlet, the upper side of the partition being corrugated and the partition having a reduced liquid passage under it.

4. In a clarifier for liquids, a tank having an inlet at one end and an outlet at the other, a pair of spaced apart partitions in the tank oblique toward the ends of the tank and in opposite directions and corrugated on their upper sides to arrest sediment deposited thereon and each having a lower reduced liquid passage.

5. In a clarifier for liquids, a tank having an inlet at one end and an outlet at the other, a pair of spaced apart oppositely oblique partitions transversely of the tank each having a liquid flow below them, and means between the partitions for removing matter suspended in the liquid by contact and adhesion.

6. In a clarifier for liquids, a tank having an inlet and an outlet, a pair of spaced apart oppositely oblique partitions transversely of the tank each having a liquid flow below them, means between the partitions for removing matter suspended in the liquid by contact and adhesion comprising one or more units each unit comprising a plurality of oblique members spaced apart for flow of liquid between them, when one or more of said members are submerged in the liquid, baffle boards separating some or all of the units having a liquid flow below them.

7. In a clarifier for liquids, a tank having an inlet and an outlet, a pair of spaced apart oppositely oblique partitions transversely of the tank each having a liquid flow below them, means between the partitions for removing matter suspended in the liquid by contact and adhesion comprising one or more units each unit comprising a plurality of oblique members, spaced apart for flow of liquid between them, when one or more of said members are submerged in the liquid, baffle boards separating some or all of the units having a liquid flow below them.

In testimony whereof I affix my signature.

SIMON H. BRAKENSIEK.